(12) United States Patent
Heine et al.

(10) Patent No.: US 9,757,867 B2
(45) Date of Patent: Sep. 12, 2017

(54) JOINT

(71) Applicant: Fiskars Finland Oy Ab, Helsinki (FI)

(72) Inventors: Mikko Heine, Helsinki (FI); Mika Sokka, Tuusula (FI)

(73) Assignee: Fiskars Finland Oy Ab, Helsinki (FI)

( * ) Notice: Subject to any disclaimer, the term of this patent is extended or adjusted under 35 U.S.C. 154(b) by 0 days.

(21) Appl. No.: 15/065,365

(22) Filed: Mar. 9, 2016

(65) Prior Publication Data

US 2016/0271813 A1   Sep. 22, 2016

(30) Foreign Application Priority Data

Mar. 19, 2015 (FI) .................................. 20155191

(51) Int. Cl.
  *B26B 13/28*   (2006.01)
  *F16B 39/02*   (2006.01)
  *A01G 3/02*    (2006.01)

(52) U.S. Cl.
  CPC ............... *B26B 13/28* (2013.01); *A01G 3/02* (2013.01); *F16B 39/023* (2013.01); *Y10T 403/32967* (2015.01)

(58) Field of Classification Search
  CPC .... A01G 3/02; B25B 7/06; B25B 7/08; B26B 13/28; B26B 13/285; B26B 17/00; F16B 39/284; F16B 39/34; Y10T 403/32951; Y10T 403/32967; Y10T 403/3946; Y10T 403/3953; Y10T 403/3966; Y10T 403/3986; Y10T 403/4694; Y10T 403/557; Y10T 403/7058

USPC ....... 403/161, 163, 194, 195, 197, 200, 263, 403/297, 371; 411/112
  See application file for complete search history.

(56) References Cited

U.S. PATENT DOCUMENTS

| 2,939,215 A | * | 6/1960 | Putsch | .......... B25B 7/08 30/266 |
| 4,478,532 A | * | 10/1984 | Puro | .......... B25B 7/08 16/342 |
| 5,006,025 A | | 4/1991 | Duran | |
| 5,037,259 A | | 8/1991 | Duran et al. | |

(Continued)

FOREIGN PATENT DOCUMENTS

| CH | 573288 A5 * | 3/1976 | ............... B25B 7/06 |
| EP | 0 214 107 A1 | 3/1987 | |

(Continued)

OTHER PUBLICATIONS

Finland Office Action, App. No. 20155191, 4 pages (Jul. 7, 2016).

(Continued)

*Primary Examiner* — Josh Skroupa
(74) *Attorney, Agent, or Firm* — Foley & Lardner LLP

(57) ABSTRACT

A joint for a cutting tool includes a bolt with a head in a first end, with a thread in a second end, and with an intermediate section between the first end and the second end, which during attachment of two objects rotatably to each other protrudes trough openings in said objects. A nut is received on the thread. In order to provide an easy solution for adjusting the tension of the joint and at the same time preventing accidental loosening of the joint, the bolt is provided with a cavity. An expansion bolt with a threaded end protrudes into the cavity and expands the second end of the bolt.

7 Claims, 1 Drawing Sheet

(56) References Cited

U.S. PATENT DOCUMENTS 8,267,630 B2 * 9/2012 Moon ................... F16B 5/02
  411/110
8,393,083 B2 * 3/2013 Wu ..................... B26B 13/08
  30/195

FOREIGN PATENT DOCUMENTS

EP  0 214 107 A1  3/1987
FR  716 305 A  12/1931

OTHER PUBLICATIONS

Finland Search Report, App. No. 20155191, 1 page (Nov. 13, 2015).
English-language machine translation of FR 716 305-A, M. Gabriel Dabat (Dec. 18, 1931).
Extended European Search Report, EP 16160554.8, Fiskars Finland Oy Ab, 5 pages (Jul. 25, 2016).

* cited by examiner

JOINT

CROSS-REFERENCE TO RELATED APPLICATIONS

This Application claims the benefit of and priority to Finnish Application No. 20155191, filed on Mar. 19, 2015, all of which is incorporated by reference herein in its entirety.

BACKGROUND OF THE INVENTION

Field of the Invention

This invention relates to joint for attaching two objects rotatably to each other. In the following the joint will be explained mainly by referring to cutting tools. It should, however, be observed that the joint may be utilized also in other devices.

Description of Prior Art

Previously there is known a cutting tool with a pair of cutting blades attached rotatably to each other by a joint. In this known solution the joint is implemented by a bolt extending through both of the cutting blades. A nut is received on the threaded end of the bolt. Thereby the cutting blades are kept together between the head of the bolt and the nut.

In order to ensure that the cutting tool works properly, it is necessary to adjust the tension of the joint and thereby the force that presses the cutting blades towards each other. In the known joint the tension of the joint may be adjusted by rotating the bolt and nut in relation to each other such that the distance between the head of the bolt and the nut changes.

A problem with the known joint is that the bolt and nut may accidentally rotate in relation to each other. If such rotation occurs, the tension of the joint may become lower or higher than intended, with the result that the cutting blades are no longer able to cut accurately.

SUMMARY OF THE INVENTION

An object of the present invention is to solve the above mentioned problem and to provide a joint which provides an easy solution for adjusting the tension of the joint at the same time as accidental loosening of the joint may be efficiently prevented. This object is achieved with the joint according to independent claim 1.

The use of a expansion bolt arranged within a cavity in the second end of the bolt makes it possible to simply and accurately create forces that expand the second end of the bolt. Consequently, the nut which is received on thread at the second end of the bolt can be prevented from accidentally rotating in relation to the bolt, in other words locked to its correct position on the bolt by means of the expansion bolt.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figure 1:
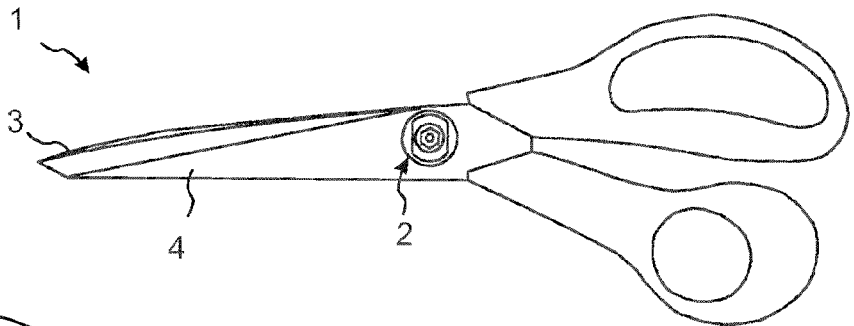
FIG. 1 illustrates a cutting tool with a joint.

FIG. 1 illustrates a cutting tool 1 with a joint 2. It should, however, be observed that the joint may be utilized also in other connections. In the illustrated example the cutting tool 1 consists of a pair of scissors, though the joint 2 can also be used in other cutting tools such as in a pair of garden pruners or in a pair of loppers, for instance.

In the cutting tool 1, the joint 2 attaches rotatably to each other two objects 3 and 4, which in the case of a cutting tool, consists of cutting blades. The cutting blades, which both are provided with a through hole for the joint, are arranged with their flat inner surfaces towards each other in such a way that the holes of the cutting blades are on top of each other. The cross-sectional shape of the holes may be circular. The joint 2 is implemented as a pin joint, where a bolt protrudes through both of the objects 3 and 4 via the holes in the cutting blades. Depending on the implementation, the parts of the joint 2 may be manufactured of steel or of plastic, for instance.

Figure 2:
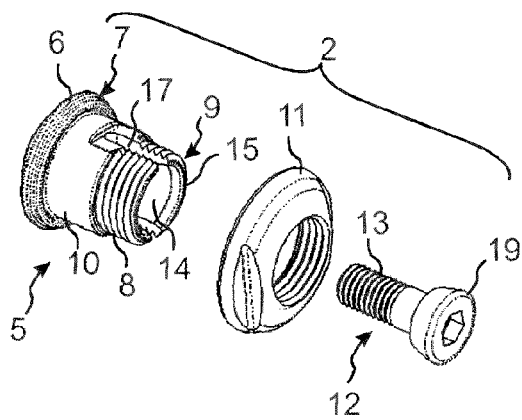
FIGS. 2 to 4 illustrate the joint of FIG. 1.
Figure 3:
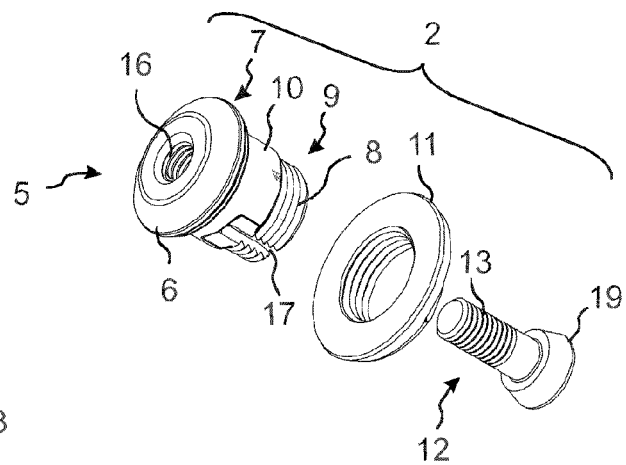
Figure 4:
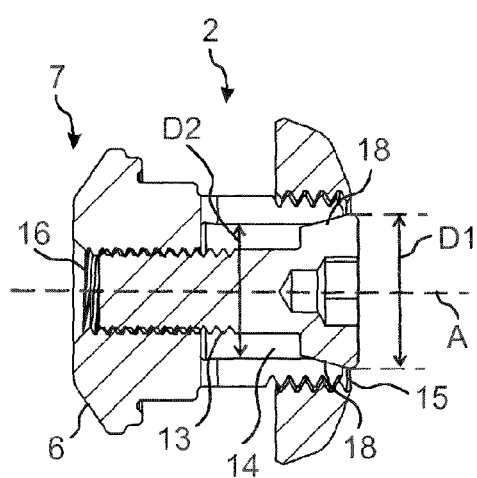

FIGS. 2 to 4 illustrate the joint of FIG. 1 in more detail. FIGS. 2 and 3 illustrate the parts of the joint before assembly, and FIG. 4 illustrates a cross section of the assembled joint 2.

The joint 2 comprises a bolt 5 with a head 6 in a first end 7 of the bolt and with a thread 8 in a second end 9 of the bolt. The first end 7 of the bolt and the second end 9 of the bolt are separated from each other by an intermediate section 10 which during attachment of the two objects 3 and 4 rotatably to each other protrudes through openings in said objects. In the illustrated example, in order to facilitate smooth and easy mutual rotation of the objects, the intermediate section 10 has a generally cylindrical shape.

A nut 11 is received on the thread 8 of the bolt 5, as seen in FIG. 4. Consequently, the head 6 of the bolt 5 together with the nut 11 keep the objects 3 and 4 together by a force which may be adjusted by turning the nut 11 in relation to the bolt 5. In that case the force, in other words the tension of the joint 2, is increased or decreased depending on the direction of the mutual rotation of the nut and bolt, as due to the thread the distance between the nut 11 and head 6 either increases or decreases during mutual rotation.

In order to prevent that the nut 11 and bolt 5 accidentally rotate in relation to each other, which would increase or decrease the tension of the joint 2, the joint 2 is provided with a locking arrangement. This locking arrangement comprises an expansion bolt 12 with a threaded end 13 protruding into a cavity 14 which is provided in an end surface 15 of the bolt 5 in the second end 9. The cavity 14 extends in an axial direction A of the bolt 5 and has a threaded 16 side wall.

The threaded end 13 of the expansion bolt 12 engages the threads 16 in the wall of the cavity 14 such that rotation of the expansion bolt 12 in relation to the bolt 5 moves the expansion bolt 12 deeper into the cavity, or in the opposite direction of rotation, outwards from the cavity 14. The diameter D1 of the expansion bolt 12 is larger than the diameter D2 of the cavity at the second end 9 of the bolt 5. Therefore, when the expansion bolt 12 is moved into the cavity 14 by rotating it in relation to the bolt 5, the expansion bolt 12 directs forces expanding the second end 9 of the bolt 5 towards the wall of the cavity 14. Expansion of the second end 9 of the bolt 5 causes the thread 8 in the second end 9 of the bolt 5 to be pressed against the nut 11. This efficiently locks the nut 11 in place.

In case the tension of the joint 2 needs to be adjusted, the nut 11 may be released. This can be done by moving the expansion bolt 12 outwards from the cavity 14 such that the second end 9 of the bolt 5 may return to its original shape. At that stage the nut 11 may be moved by rotation in relation to the bolt 5 until the distance between the head 6 and the nut 11 is such that a desired tension is obtained for the joint 2. Finally the nut 11 can be locked in its new position by moving the expansion bolt 12 inwards in to the cavity 14. Adjustment of the tension of the joint is therefore very easy and user friendly. Additionally, the adjustment can be repeated an unlimited number of times without any reduction in the functionality.

In the illustrated example the second end 9 of the bolt 5 is provided with a slit 17 extending in the axial direction A of the bolt 5. This slit 17 provides an opening into the cavity from the side of the bolt 5. Such a slit 17 is not necessary in all embodiments as depending on the implementation it may be possible to obtain a sufficient expansion of the second end 9 of the bolt 5 also without a slit. However, in many implementations one or more slits 17 (two slits are shown in the illustrated example) make it easier to expand the second end 9 of the bolt 5.

In the illustrated example the contact surfaces 18 of the expansion bolt 12 and of the cavity 14 are mutually inclined such that the expansion bolt 12 works as a wedge expanding the second end 9 of the bolt 5 when the expansion bolt 5 is moved inwards into the cavity 14.

As best seen in FIG. 4, the cavity 14 extends in the axial direction of the bolt 5 from the end surface 15 to the first end 7 of the bolt 5. In the illustrated example the cavity is implemented as a through bore having openings in both end surfaces of the bolt 5 which, however, is not necessary in all embodiments. At the first end 7 of the bolt 5 the cavity 14 has a smaller diameter than at the second end 9 of the bolt. The thread 16 on the wall of the cavity 14 is located at the first end of the bolt where the cavity has the smaller diameter. The thread 13 of the expansion bolt 12 engages this thread 16 on the wall of the cavity, while the head 19 of the expansion bolt 12 has an inclined outer side surface contacting the wall of the cavity 14 at the second end of the bolt 9 for expanding the second end of the bolt.

It is to be understood that the above description and the accompanying figures are only intended to illustrate the present invention. It will be obvious to a person skilled in the art that the invention can be varied and modified without departing from the scope of the invention.

The invention claimed is:

1. A joint assembly comprising:
   a first object;
   a second object;
   a bolt with a head in a first end, with a thread in a second end and with an intermediate section between the first end and the second end, and which during attachment of said first and second objects rotatably to each other protrudes through openings in said first and second objects, and
   a nut received on said thread for keeping said first and second objects together between said head and said nut,
   an end surface of the bolt in the second end of the bolt is provided with a cavity that extends in an axial direction of the bolt and that has a wall with a thread, and
   an expansion bolt with a threaded end protruding into said cavity and engaging the thread on the wall, said expansion bolt having a larger diameter than a diameter of the cavity such that forces expanding the second end of the bolt are directed by the expansion bolt towards the wall of the cavity, wherein:
   the cavity extends in the axial direction of the bolt from the end surface to the first end of the bolt,
   an outer side surface of the second end of the bolt is provided with a slit which provides an opening into the cavity from the side of the bolt,
   the cavity has a smaller diameter at the first end of the bolt than at the second end of the bolt,
   the thread on the wall of the cavity is located at the first end of the bolt in the part of the cavity which has the smaller diameter,
   said slit extends from said end surface in the second end of the bolt towards the first end of the bolt without reaching the first end of the bolt where the cavity has said smaller diameter and where said thread on the wall of the cavity is located, and
   the expansion bolt has a head with an inclined outer side surface contacting the wall of the cavity at the second end of the bolt for expanding the second end of the bolt.

2. The joint assembly according to claim 1, wherein contact surfaces of the expansion bolt and of the cavity are mutually inclined such that the expansion bolt works as a wedge expanding the second end of the bolt when the expansion bolt is moved inwards into the cavity.

3. The joint assembly according to claim 1, wherein the intermediate section of the bolt has a generally cylindrical shape.

4. The joint assembly according to claim 1, wherein the first and second objects are a pair of cutting blades, and wherein the joint is a joint of a cutting tool which attaches rotatably to each other said pair of cutting blades.

5. A cutting tool, comprising:
   a first cutting blade coupled to a first handle and a second cutting blade coupled to a second handle;
   the first cutting blade and the second cutting blade each having a through hole in co-alignment;
   a joint assembly disposed at least partially within the through hole to rotatably join the first cutting blade and the second cutting blade together, the joint assembly comprising:
   a bolt with a head in a first end, with a thread in a second end and with an intermediate section between the first end and the second end, and which protrudes through the through holes,
   a nut received on the thread to keep the cutting blades together between the head and the nut,
   an end surface of the bolt in the second end of the bolt having a cavity that extends in an axial direction of the bolt and that has a wall with a thread,
   an expansion bolt with a threaded end protruding into the cavity and engaging the thread on the wall, the expansion bolt having a larger diameter than a diameter of the cavity such that forces expanding the second end of the bolt are directed by the expansion bolt towards the wall of the cavity,
   wherein the cavity extends in the axial direction of the bolt from the end surface to the first end of the bolt, an outer side surface of the second end of the bolt is provided with a slit which provides an opening into the cavity from the side of the bolt, the cavity has a smaller diameter at the first end of the bolt than at the second end of the bolt, the thread on the wall of the cavity is located at the first end of the bolt in the part of the cavity which has the smaller diameter, said slit extends from said end surface in the second end of the bolt towards the first end of the bolt without reaching the first end of the bolt where the cavity has said smaller diameter and where said thread on the wall of the cavity is located, and the expansion bolt has a head with an inclined outer side surface contacting the wall of the cavity at the second end of the bolt for expanding the second end of the bolt.

6. The cutting tool according to claim 5, wherein contact surfaces of the expansion bolt and of the cavity are mutually inclined such that the expansion bolt works as a wedge expanding the second end of the bolt when the expansion bolt is moved inwards into the cavity.

7. The cutting tool according to claim 5, wherein the intermediate section of the bolt has a generally cylindrical shape.

\* \* \* \* \*